United States Patent
Martin et al.

(10) Patent No.: US 12,430,030 B1
(45) Date of Patent: Sep. 30, 2025

(54) GREEN DISK ARRAY ENCLOSURE

(71) Applicant: Dell Products L.P., Round Rock, TX (US)

(72) Inventors: Owen Martin, Hopedale, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 18/619,447

(22) Filed: Mar. 28, 2024

(51) Int. Cl.
*G06F 3/06* (2006.01)

(52) U.S. Cl.
CPC .......... *G06F 3/061* (2013.01); *G06F 3/0655* (2013.01); *G06F 3/0664* (2013.01); *G06F 3/067* (2013.01)

(58) Field of Classification Search
None
See application file for complete search history.

(56) References Cited

U.S. PATENT DOCUMENTS

2020/0133538 A1* 4/2020 Nelogal .............. G06F 11/2041

* cited by examiner

*Primary Examiner* — Brian R Peugh
(74) *Attorney, Agent, or Firm* — Daly, Crowley, Mofford & Durkee, LLP

(57) ABSTRACT

A method for use in a storage system, comprising: instantiating a plurality of virtual storage devices, each virtual storage device corresponding to a different respective group of physical storage devices; assigning one or more of the plurality of virtual storage devices to a landing zone and assigning the rest of the plurality of virtual storage devices to an idle zone; instantiating a data volume, the data volume including a plurality of portions, each portion being hosted on a different respective one of the plurality of virtual storage devices; receiving an I/O request associated with the data volume, the I/O request being one of a read request or a write request; executing the I/O request.

20 Claims, 6 Drawing Sheets

212

| LBA 1 | MEMORY ADDRESS 1 | AGE INDICATOR | ⎯302 |
|---|---|---|---|
| LBA 2 | MEMORY ADDRESS 2 | AGE INDICATOR | ⎯302 |
| ••• | | | |
| LBA K | MEMORY ADDRESS K | AGE INDICATOR | ⎯302 |

| GDAT ID | ASSIGNMENT STATUS OF GDAT | |
|---|---|---|
| GDAT 1 | LANDING ZONE | ⎯402 |
| GDAT 2 | IDLE ZONE | ⎯402 |
| ••• | | |
| GDAT N | IDLE ZONE | ⎯402 |

| GDAT ID | WEAR METRIC | |
|---|---|---|
| GDAT 1 | 10% | ⎯502 |
| GDAT 2 | 11% | ⎯502 |
| ••• | | |
| GDAT N | 15% | ⎯502 |

| GDAT ID | UTILIZATION METRIC | |
|---|---|---|
| GDAT 1 | 78% | ⎯602 |
| GDAT 2 | 80% | ⎯602 |
| ••• | | |
| GDAT N | 78% | ⎯602 |

FIG. 6

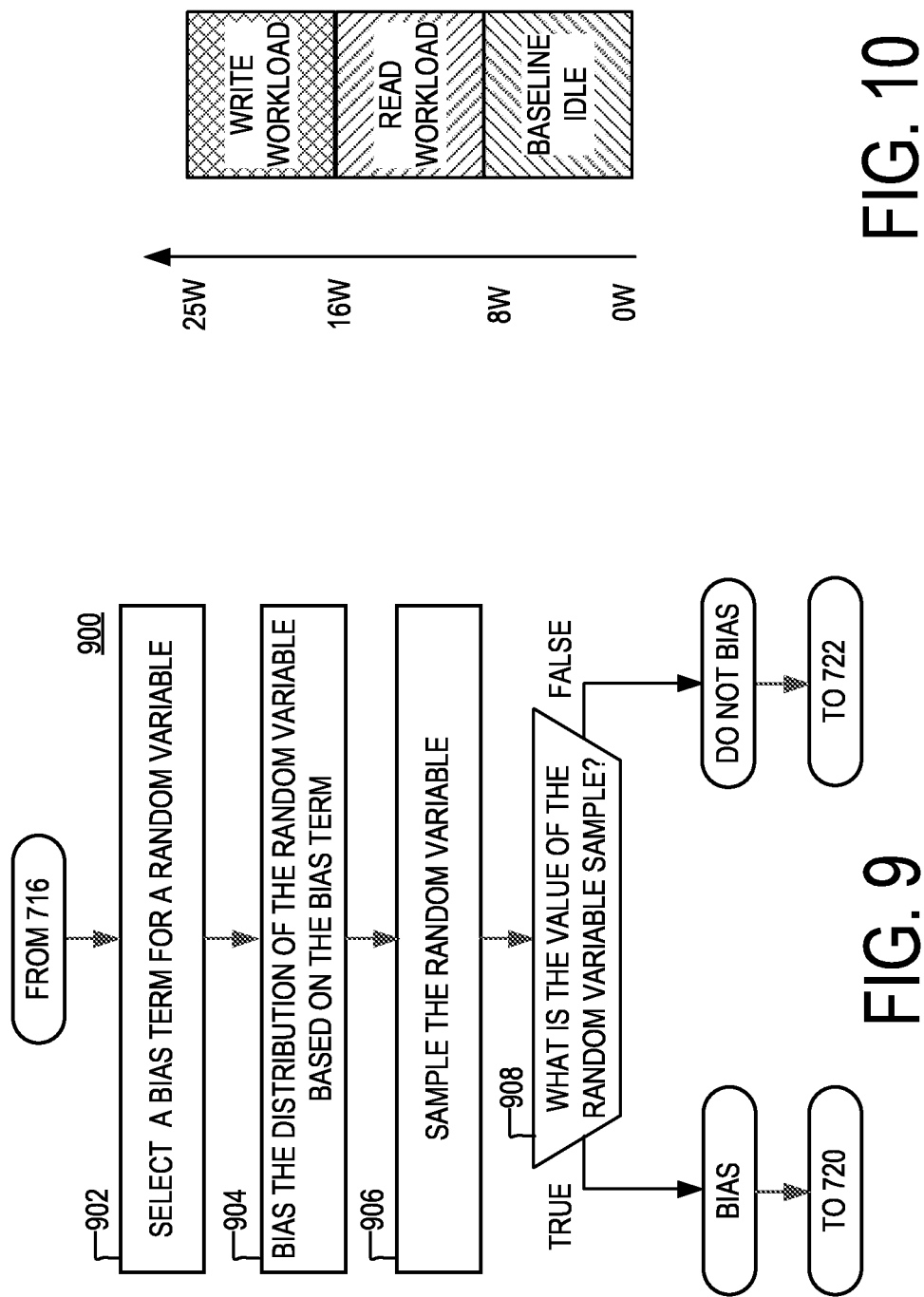

GREEN DISK ARRAY ENCLOSURE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, the method comprising: instantiating a plurality of virtual storage devices, each virtual storage device corresponding to a different respective group of physical storage devices; assigning one or more of the plurality of virtual storage devices to a landing zone and assigning the rest of the plurality of virtual storage devices to an idle zone; instantiating a data volume, the data volume including a plurality of portions, each portion being hosted on a different respective one of the plurality of virtual storage devices; receiving an I/O request associated with the data volume, the I/O request being one of a read request or a write request; executing the I/O request, wherein executing the I/O request includes: (i) when the I/O request is a write request, storing data associated with the I/O request only in virtual storage devices that are part of the landing zone, and (ii) when the I/O request is a read request, retrieving data associated with the I/O request from any of the plurality of virtual storage devices, wherein the storage system is configured to route all write requests for the data volume that are received at the storage system to virtual storage devices that are part of the landing zone.

According to aspects of the disclosure, a storage system is provided, comprising: a memory; and one or more processors that are operatively coupled to the memory, the one or more processors being configured to perform the operations of: instantiating a plurality of virtual storage devices, each virtual storage device corresponding to a different respective group of physical storage devices; assigning one or more of the plurality of virtual storage devices to a landing zone and assigning the rest of the plurality of virtual storage devices to an idle zone; instantiating a data volume, the data volume including a plurality of portions, each portion being hosted on a different respective one of the plurality of virtual storage devices; receiving an I/O request associated with the data volume, the I/O request being one of a read request or a write request; executing the I/O request, wherein executing the I/O request includes: (i) when the I/O request is a write request, storing data associated with the I/O request only in virtual storage devices that are part of the landing zone, and (ii) when the I/O request is a read request, retrieving data associated with the I/O request from any of the plurality of virtual storage devices, wherein the storage system is configured to route all write requests for the data volume that are received at the storage system to virtual storage devices that are part of the landing zone.

According to aspects of the disclosure, a non-transitory computer-readable medium is provided that stores one or more processor-executable instructions, which, when executed by one or more processors in a storage system, cause the one or more processors to perform the operations of: instantiating a plurality of virtual storage devices, each virtual storage device corresponding to a different respective group of physical storage devices; assigning one or more of the plurality of virtual storage devices to a landing zone and assigning the rest of the plurality of virtual storage devices to an idle zone; instantiating a data volume, the data volume including a plurality of portions, each portion being hosted on a different respective one of the plurality of virtual storage devices; receiving an I/O request associated with the data volume, the I/O request being one of a read request or a write request; executing the I/O request, wherein executing the I/O request includes: (i) when the I/O request is a write request, storing data associated with the I/O request only in virtual storage devices that are part of the landing zone, and (ii) when the I/O request is a read request, retrieving data associated with the I/O request from any of the plurality of virtual storage devices, wherein the storage system is configured to route all write requests for the data volume that are received at the storage system to virtual storage devices that are part of the landing zone.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of an example of a table, according to aspects of the disclosure;

FIG. 4 is a diagram of an example of a table, according to aspects of the disclosure;

FIG. 5 is a diagram of an example of a table, according to aspects of the disclosure;

FIG. 6 is a diagram of an example of a table, according to aspects of the disclosure;

FIG. 9 is a flowchart of an example of a process, according to aspects of the disclosure; and FIG. 10 is a graph illustrating the power consumption of a storage device, according to aspects of the disclosure.

DETAILED DESCRIPTION

Figure 1:
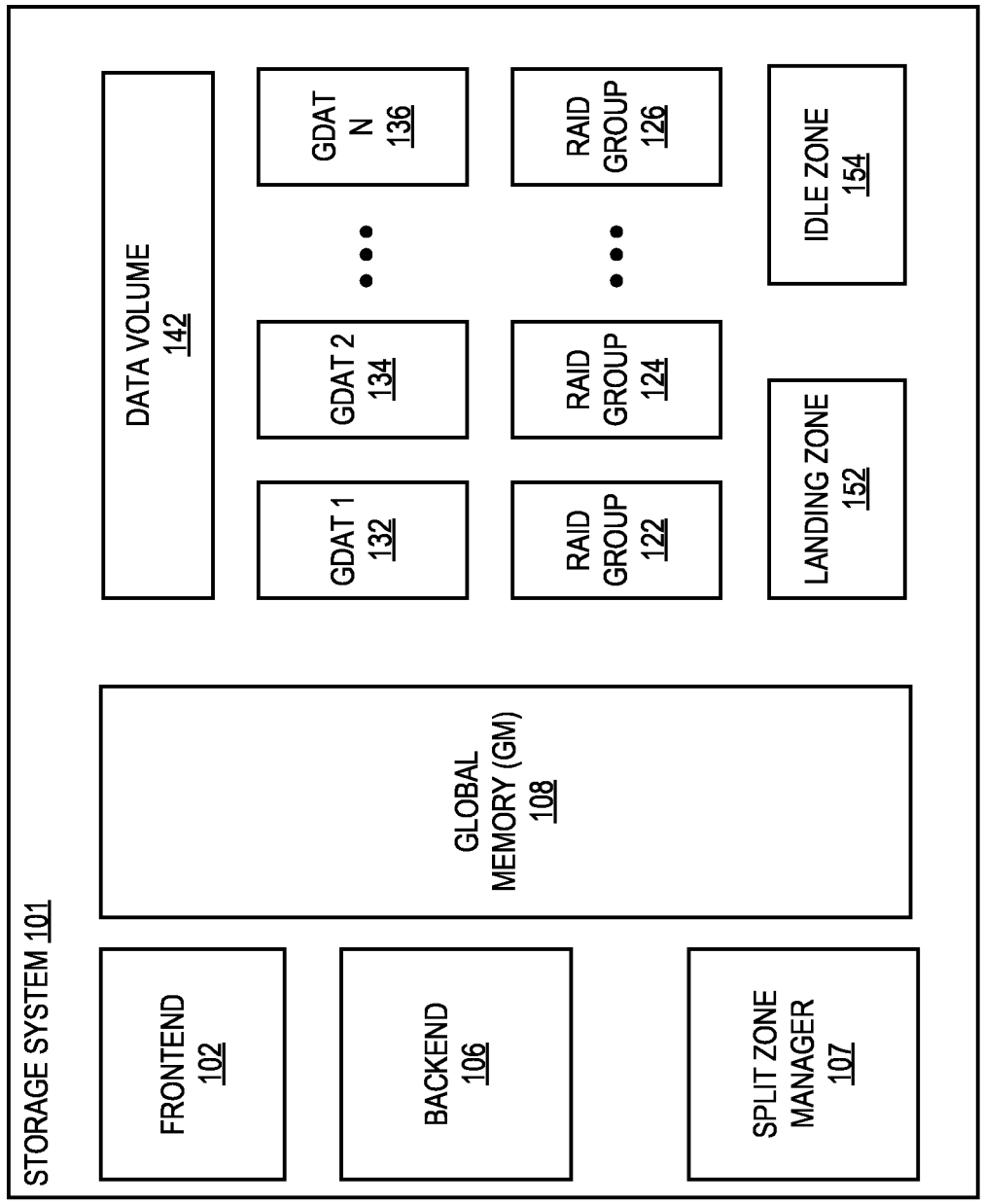
FIG. 1 is a diagram of an example of a storage system, according to aspects of the disclosure.

FIG. 1 is a diagram of an example of a storage system 101, according to aspects of the disclosure. Storage system 101 may include any suitable type of storage system, such as such as a DELL Technologies Powermax™ storage system or a DELL Technologies PowerStore™ storage system, for example. The storage system 101 may include a plurality of storage processors, such as the storage processor 202, which is discussed further below. Together, the storage processors may be configured to implement a frontend 102 and a backend 106. In one example, the frontend 102 may be configured to receive requests to write data to a volume 142 and cache the data into a global memory (GM) 108. The backend 106 may destage the cached data into any of Redundant Array of Disks (RAID) groups 122-126 that are provided in storage system 101. It will be understood that the present disclosure is not limited to any specific implementation of the frontend and 102 and backend 106. Furthermore, it will be understood that the frontend 102 and backend 106 may perform other functions, in addition to the ones described.

GM 108 includes a memory space that is shared among the storage processors in storage system 101, and which is used for the caching of data. GM 108 may include a plurality of portions, where each portion is hosted on a different physical random-access memory (RAM) module. Each physical memory module may be part of a different storage processor. In other words, GM 108 may be implemented by using the memory modules that are available in different storage processors of the storage system 101.

GM 108 may be implemented by using a global memory table 212, an example of which is shown in FIG. 3. In some implementations, instances of table 212 may be stored (and synchronized) in different storage devices (or elsewhere) in the storage system 101. As illustrated, table 212 may include a plurality of entries 302. Each entry 302 may represent a different cache slot in GM 108. Each entry 302 (if allocated) may include (i) an indication of the LBA in data volume 142 it has been allocated to, (ii) a memory address identifying the physical memory used to implement the entry's corresponding cache slot, and (iii) an age indicator for the cache slot. The age indicator may include a number, a string, or an alphanumerical string that indicates for how long the cache slot has been allocated to a particular LBA. The storage system 101 may allocate the slots in GM 108 by using a least recently used (LRU) algorithm, and the age indicators that are present in entries 302 may be used to determine which one of the cache slots in GM 108 is "least recently used".

The storage system 101 may include a plurality of storage devices (not shown). The storage devices may include solid-state disks (SSDs), hard disks (HDs), and/or any other suitable storage devices. The storage devices may be organized in the RAID groups 122-126. Although, in the present example, storage system 101 is provided with only three RAID groups, in most practical implementations, storage system 101 may have a larger number of RAID groups, such as 30 RAID groups or 50 RAID groups. It will be understood that the present disclosure is not limited to any specific number of RAID groups being present in storage system 101. The RAID groups may be RAID 3 groups, RAID 5 groups, and/or any other suitable type of RAID group. The storage devices used to implement the RAID groups may be housed in a dedicated disk array enclosure (DAE).

The storage system 101 may be configured to provide green data access terminals (GDATs) 132-136. Each of the GDATs 132 may be a virtual storage device that represents a different one of the RAID groups 122-126. In some implementations, the storage system 101 may provide as many GDATs as there are RAID groups in the storage system 101. According to the present example, GDAT 132 represents RAID group 122, such that writing data to GDAT 132 causes the data to be stored in RAID group 122, and reading data from GDAT 132 causes the data to be retrieved from RAID group 122. GDAT 134 represents RAID group 124, such that writing data to GDAT 134 causes the data to be stored in RAID group 124, and reading data from GDAT 134 causes the data to be retrieved from RAID group 124. And GDAT 136 represents RAID group 126, such that writing data to GDAT 136 causes the data to be stored in RAID group 126, and reading data from GDAT 136 causes the data to be retrieved from RAID group 126. Although, in the present example, storage system 101 includes 3 GDATs, most practical applications would include a larger number of GDATs, such as 30 or 50 for example. The present disclosure is not limited to any specific number of GDATs being made available in storage system 101.

The storage system 101 may include a data volume 142. Data volume 142 may include a plurality of portions, where each portion is hosted on a different one of the GDATs that are provided in storage system 101. Consider an example in which data volume 142 includes 9 blocks. In this example, blocks 1, 5, and 7 may be hosted on GDAT 132, such that data written to these blocks is stored in GDAT 132 (and/or RAID group 122), and data read from these blocks is retrieved from GDAT 132 (and/or RAID group 122). Blocks 2, 3, and 9 may be hosted on GDAT 134, such that data written to these blocks is stored in GDAT 134 (and/or RAID group 124), and data read from these blocks is retrieved from GDAT 134 (and/or RAID group 124). And blocks 4, 7, and 8 may be hosted on GDAT 136, such that data written to these blocks is stored in GDAT 136 (and/or RAID group 126), and data read from these blocks is retrieved from GDAT 136 (and/or RAID group 126). Although, in the present example, data volume 142 is divided into three portions, the present disclosure is not limited to data volume 142 being divided into any specific number of portions. For example, in some implementations, the data volume may be divided into 30 or 50 data portions. As another example, the data volume 142 may be divided into as many (or fewer) portions as there are GDATs in storage system 101. According to the present example, data volume 142 is fully-provisioned, meaning that there is reserved physical storage space for use by data volume 142, whose combined size is greater than or equal to the entire capacity of data volume 142.

The GDATs in storage system 101 may be assigned to a landing zone 152 and an idle zone 154. The landing zone 152 is a group including some of the GDATs that host data volume 142 and the idle zone 154 is a group including the rest of the GDATs that host data volume 142. The landing zone 152 and the idle zone 154 may be defined by using a zone assignment table 214, an example of which is shown in FIG. 4. As illustrated, the zone assignment table 214 may include a plurality of entries 402. Each entry 402 may correspond to a different GDAT that is used to host data volume 142. Each entry 402 may include an identifier of its corresponding GDAT, as well as an indication of whether the corresponding GDAT is currently assigned to landing zone 152 or idle zone 154.

The segregation of the GDATs into a landing zone 152 and an idle zone 154 is used by storage system 101 to effectuate a power-saving method. According to the power-saving method, when writes are received for data volume 142, the data associated with those writes is stored exclusively in GDATs that are part of the landing zone 152, such that no data is written to any of the storage devices (or corresponding RAID groups) that are currently in the idle zone. FIG. 10 shows an example of the power consumption of a storage device that is used to implement any of the GDATs that host data volume 142 (or their underlying RAID group). FIG. 10 illustrates that the storage device consumes up to 25 W, when data is written or read from the storage device. FIG. 10 further illustrates that the storage device may consume up to 16 W when the use of the storage device is limited to reading data that is already stored in the storage device. And finally, FIG. 10 illustrates that the storage device may consume up to 8 W in idle mode (i.e., when the storage device is not used to write or read data). In other words, by restricting the RAID groups (and underlying storage devices) that are part of the idle zone to service only read requests (but not write requests), the storage system 101 may achieve net power savings (in comparison to when all RAID groups that host data volume 142 are used to execute both read and write requests.

In another aspect, storage system 101 may bias cache slots that are allocated to LBAs hosted by GDATs belonging in idle zone 154. Normally, when a cache slot is allocated, the age indicator for the cache slot may be set to a "regular initial value". The regular initial value may be '0' for example. On the other hand, when a cache slot is biased, upon the allocation of the cache slot, the age indicator of the cache slot may be set to an "irregular initial value". The irregular initial value may be '−20' for example and/or any other value that is lower than the regular initial value. After a cache slot is allocated, the age indicator of the slot is incremented with the passage of time (e.g., incremented every second, etc.). The larger the age indicator, the least recently used the cache slot appears to have been, and thus the more likely the cache slot is to be deallocated and/or allocated to a different LBA. In this regard, biased cache slots would appear to storage system 101 to have been used more recently than it is the case. This in turn would cause biased cache slots to remain allocated to the same LBA for longer periods of time than unbiased cache slots.

Biasing the cache slots allocated to LBAs that are hosted by GDATs belonging in the idle zone 154 would cause those cache slots to remain allocated for longer periods of time relative to cache slots allocated to LBAs in GMATs belonging in the landing zone 152. This in turn would increase the probability of cache hits in the idle zone 154 (relative to the probability of cache hits in the landing zone 152), which in turn would further reduce the power consumption of storage devices in idle zone 154. The power consumption is reduced because when there is a cache hit, the data associated with the cache hit can be retrieved from GM 108 rather than by executing a read operation on any of the storage devices in idle zone 154. Put simply, biasing the cache slots allocated to LBAs in the idle zone, reduces the number of reads that need to be performed by storage devices in the landing zone, which in turn reduces their power consumption.

The phrase "biasing a cache slot" may refer to any action that causes the cache to appear more recently used than is the case. Setting the initial value of an age indicator of a cache slot to a lower value is an example of one possible way for biasing the cache slot. However, the present disclosure is not limited to any specific method for biasing a cache slot because the exact method used may depend on the implementation.

In yet another aspect, the power-saving method may involve rotating GDATs in and out of landing zone 152 so as to ensure an even wear of all GDATs that are used to host data volume 142. For example, the power-saving method may include removing one of the GDATs that are currently part of the landing zone 152 and adding the GDAT to the idle zone 154 when a wear metric of the GDAT crosses a threshold, while also moving one of the GDATs that are currently in the idle zone 154 to the landing zone 152. In the present example, the wear metric exceeding the threshold signals that the GDAT has become more worn-out than other ones of the GDATs that host data volume 142. In some implementations, a GDAT may be kept in the landing zone 152 until the wear metric of the GDAT has increased (or decreased) by a predetermined amount (e.g., 5 percentage points), relative to the value of the wear metric when the GDAT was most recently added to the landing zone 152.

Moreover, in yet another aspect, the power-saving method may include increasing the number of GDATs that are part of the landing zone in response to the utilization rate of any of the GDATs that are used to implement the data volume 142 crossing a threshold. For example, the power-saving method may include adding one of the GDATs that are currently part of the idle zone 154 to the landing zone 152 (without removing any GDATs that are currently in the landing zone 152), in response to detecting that a utilization metric of any of the GDATs used to implement the volume has crossed a threshold. In the present example, the utilization metric crossing the threshold signals that the GDAT is becoming full. Adding a GDAT to the landing results in an overall increase in the number of GDATs that are present in the landing zone 152. This is in contrast to the rotation of GDATs which results in no net change in the number of GDATs that are currently present in the landing zone 152.

In some implementations, the routing of write requests to the landing zone and the biasing of cache slots may be performed in accordance with a process 700, which is discussed further below with respect to FIG. 7. Moreover, the wear-leveling and expansion aspects of the power-saving method may be performed in accordance with a process 800, which is discussed further below with respect to FIG. 8.

The storage system 101 may be configured to implement a zone manager 107 (hereinafter "manager 107"). Manager 107 may include one or more threads. Any of the threads that are part of zone manager 107 may be executed on a storage processor or another computing device that is part of storage system 101. Although in the present example, manager 107 is represented as a separate block, it will be understood that manager 107 may be implemented, at least in part, by modifying existing services (or kernel components) that are part of the frontend or backend of a storage system and/or modifying other existing services or components. The present disclosure is not limited to any specific implementation of manager 107. In some implementations, manager 107 may be configured to execute processes 700-800, which are discussed further below with respect to FIGS. 7-8.

Figure 2:
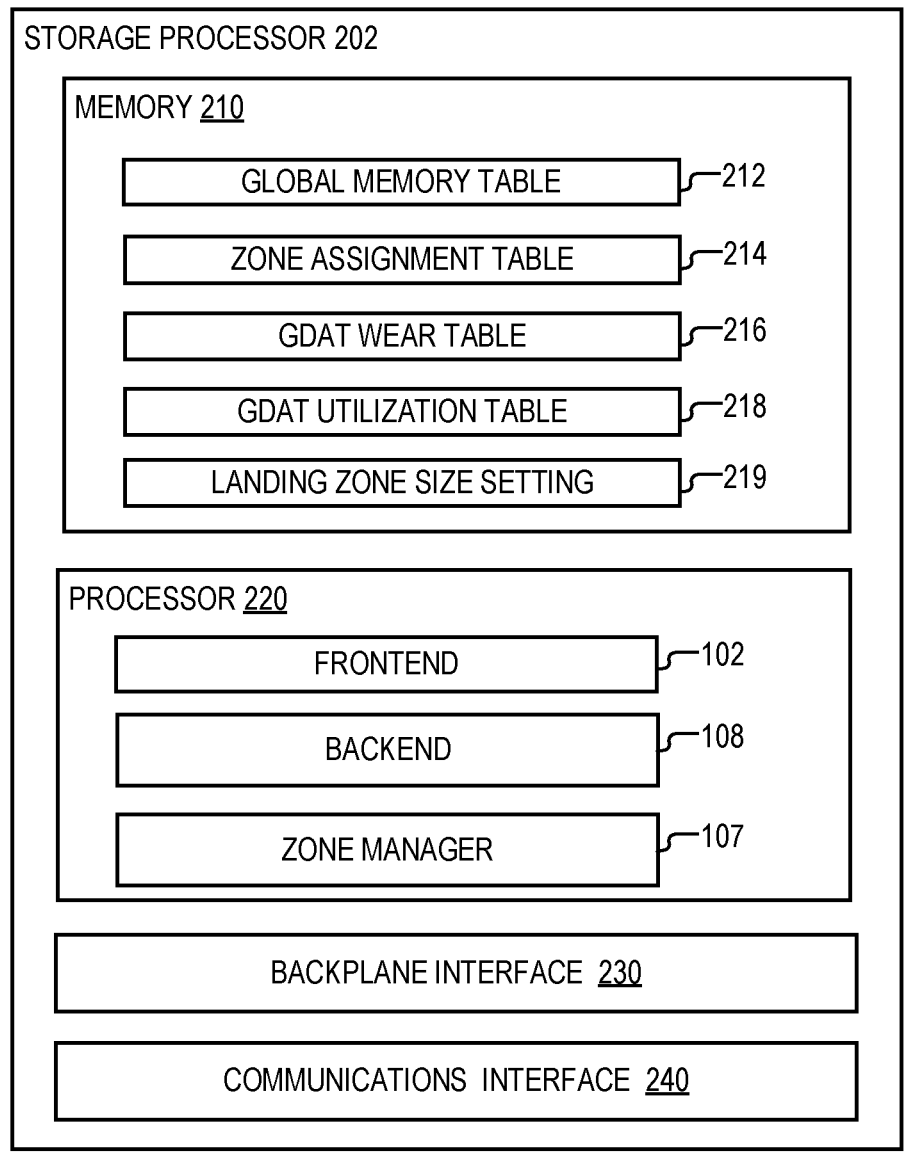
FIG. 2 is a diagram of an example of a storage processor, according to aspects of the disclosure.

FIG. 2 is a diagram of an example of a storage processor 202, according to aspects of the disclosure. As illustrated, the storage processor 202 may include a memory 210, a processor 220, a backplane interface 230, and a communications interface 240. The memory 210 may include one or more of a random-access memory (RAM), a dynamic random memory (DRAM), a flash memory, a hard drive (HD), a solid-state drive (SSD), a network-accessible storage (NAS), and or any other suitable type of memory device. The communications interface 240 may include any suitable type of communications interface, such as one or more Ethernet adapters, one or more Wi-Fi adapters (e.g., 802.1414 adapters), and one or more Long-Term Evolution (LTE) adapters, for example. The processor 220 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The communications interface 240 may include any suitable type of communications interface, such as one or more Ethernet adapters, one or more InfiniBand adapters, one or more Wi-Fi adapters (e.g., 802.1414 adapters), and one or more Long-Term Evolution (LTE) adapters, for example.

Memory 210 may store the global memory table 212 and the zone assignment table 214. In addition, the memory 210 may store a landing zone size setting 219, as well as a GDAT wear table 216 and a GDAT utilization table 218. The landing zone size setting 219 may specify the number of GDATs that must be assigned at all times to the landing zone 152. When the landing zone 152 is initially initialized, the storage system 101 may look at the size setting and assign, to landing zone 152, as many GDATs as specified by the landing zone size setting 219. For example, if the landing zone size setting is '3', the storage system 101 may assign 3 GDATs to the landing zone 152. As another example, if the landing zone size setting is '5', the storage system 101 may assign 5 GDATs to the landing zone 152.

FIG. 5 is a diagram of an example of wear table 216, according to aspects of the disclosure. Wear table 216 may include a plurality of entries 502. Each entry 502 may correspond to a different one of the plurality of GDATs that host data volume 142. Each entry 502 may include an identifier of the entry's corresponding GDAT, as well as the value of a wear metric for the GDAT. A wear metric may include any measure that is at least in part indicative of how much wear has been so far imparted on a GDAT or any of the physical storage devices that implement the GDAT's underlying RAID group. Examples of a wear metric may include "endurance used", "remaining percent life", a count of write operations that have been performed on the GDAT, throughput to the GDAT, and so forth. The wear metric for a GDAT is equivalent to the wear metric for the RAID group that is represented by the GDAT. The wear metric of a RAID group may be the average value of the wear metrics (of the same type) of each of the storage devices in the RAID group. For instance, the wear metric of a RAID group may be the average percent remaining life of the individual storage devices (e.g., SSDs) in the RAID group. In another example, the wear metric of a RAID group may be the value of the wear metric for the most worn-out device in the RAID group. Consider a RAID group of 3 devices, each having percent life remaining equal to 10%, 20%, and 30% respectively. In this example, the value of the wear metric for the entire group would be equal to "10%". It will be understood that the present disclosure is not limited to any specific method for calculating the wear metric for a RAID group.

FIG. 6 is a diagram of an example of utilization table 218, according to aspects of the disclosure. As illustrated, the utilization table 218 may include a plurality of entries 602. Each of the entries 602 may correspond to a different one of the plurality of GDATs that host data volume 142. Each entry 216 may include an identifier of the entry's corresponding GDAT as well as an indication of the utilization rate of the GDAT. The utilization rate of the GDAT may be any metric that is indicative of the degree to which the GDAT is full. For example, if a GDAT has a total capacity of 100 GB and 78 GB is already used to store (clean) data, the GDAT may have a utilization rate of 78%.

According to the present example, tables 212-218 are global to storage system 101, such that each of tables 212-218 can be accessed and/or updated by any of the storage processors of storage system 101. Instances of tables 212-218 may be stored in any storage processor that is part of storage system 101, and/or in any other computing device that is part of storage system 101. For ease of description, tables 212-218 are described as including entries corresponding only to GDATs that are used to host data volume 142, however, in many practical implementations, any of the tables may include entries that correspond to GDATs (or LBAs) that are associated with other volumes in storage system 101. Furthermore, it will be understood that the present disclosure is not limited to any specific information being stored in any of tables 212-218. As used herein, the term "table" may refer to any suitable type of data structure, or a set of data structures. For example, a table may be a search tree, a linked list, and so forth. The term "data structure" may include any suitable type of contiguous or non-contiguous memory space. In some implementations, at least some of tables 212-218 may be integrated together.

Returning to FIG. 2, the processor 220 may be configured to execute threads that are part of the frontend 102, backend 106, and manager 107. In some implementations, manager 107 may be configured to monitor the wear level of the GDATs identified in table 216 and update table 216 accordingly. Additionally or alternatively, manager 107 may be configured to monitor the utilization rate of different GDATs and update table 218 accordingly.

In some implementations, manager 107 may continually monitor the respective wear metric of each of the plurality of GDATs that are currently in the landing zone 152 and generate a rotation event when the utilization rate of any of the GDATs increases by a predetermined amount. Consider an example in which the wear metric is endurance used. In this example, when any GDAT is assigned to landing zone 152, manager 107 may register the current value of the endurance used of that GDAT. Next, manager 107 may begin to continuously monitor the endurance used of the GDAT as its value begins to increase. Next, manager 107 may detect when the endurance used of the GDAT has increased by a predetermined amount (e.g., 5 percentage points). And finally, in response to detecting that the endurance used has increased by the predetermined amount, manager 107 may generate a rotation event. The rotation event may be handled by other components of manager 107 (i.e., other than the components involved in the monitoring), as discussed further below with respect to steps 804-810 of process 800. It will be understood that this is an example of only one possible way of generating a rotation event, and the present disclosure is not limited to any specific method for generating rotation events. As used herein, the phrase "rotation event" refers to any event that is generated when a wear metric has crossed a threshold (either a fixed threshold or a floating threshold).

Additionally or alternatively, in some implementations, manager 107 may continually monitor the respective utilization metrics of each of the GDATs that are assigned to the landing zone 152 and the idle zone 154. In response to detecting that the utilization rates of any of the GDATs has exceeded a predetermined threshold (e.g., 85% utilization), manager 107 may generate an expansion event. The expansion event may be handled by other components of manager 107 (i.e., other than the components involved in the monitoring of the utilization rate), as discussed further below with respect to steps 812-814 of process 800.

Figure 7:
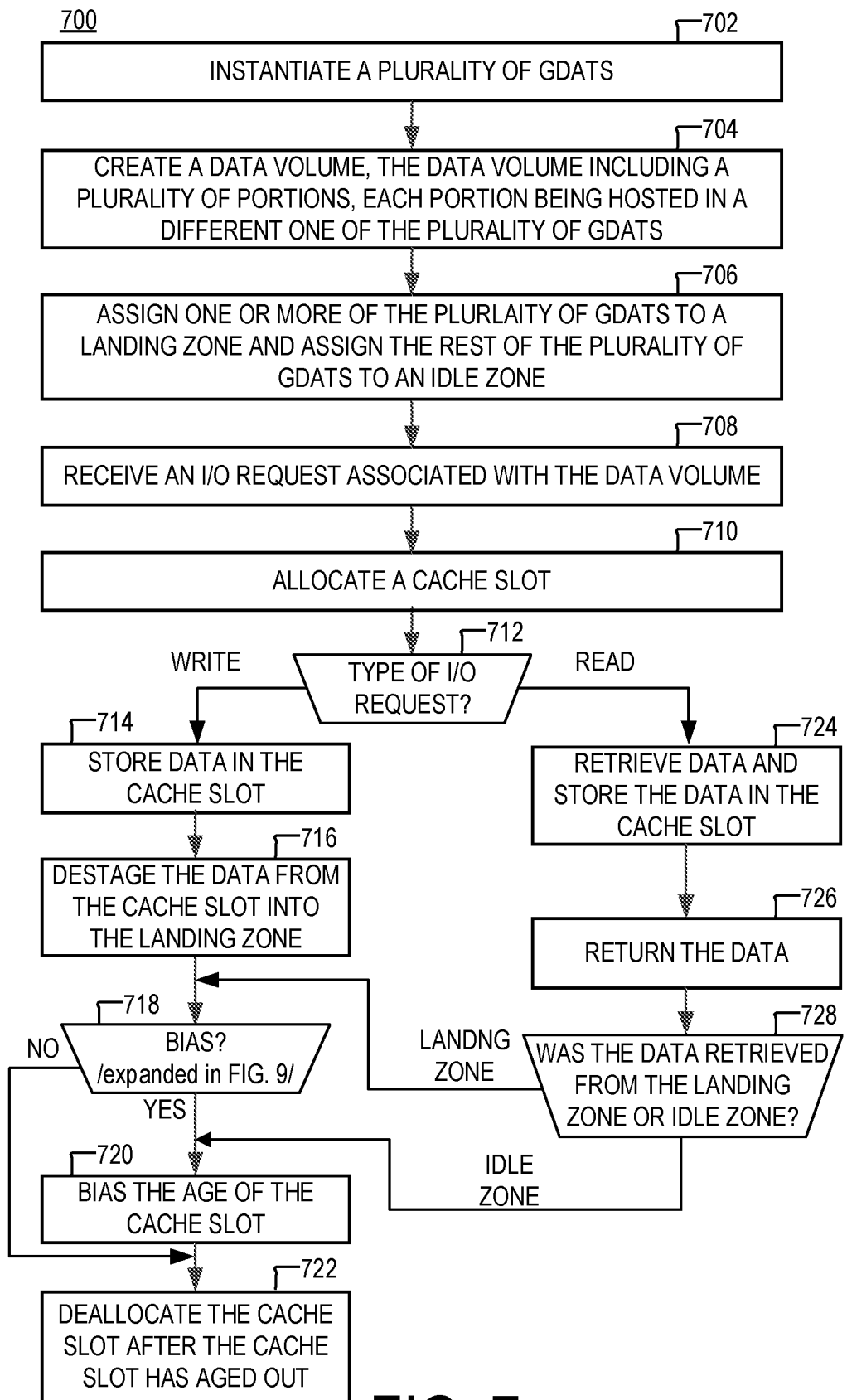
FIG. 7 is a flowchart of an example of a process, according to aspects of the disclosure.

FIG. 7 is a flowchart of an example of a process 700, according to aspects of the disclosure. According to the present example, process 700 is performed by manager 107. However, the present disclosure is not limited to any entity or set of entities performing the process 700.

At step 702, a plurality of GDATs is instantiated. The plurality of GDATs may be the same or similar to GDATs 132-136, which are discussed above with respect to FIG. 1.

At step 704, a data volume is created. The data volume may be the same or similar to the data volume 142, which is discussed above with respect to FIG. 1. The data volume may consist of a plurality of portions, wherein each portion is hosted on a different one of the GDATs (instantiated at step 702). Each of the GDATs may be a virtual device representing an underlying RAID group, such as the RAID groups 122-126.

At step 706, some of the plurality of GDATs are assigned to a landing zone, and the rest of the plurality of GDATs are assigned to an idle zone. The number of GDATs assigned to the landing zone may be specified by a landing zone size setting, such as setting 219, which is discussed above with respect to FIG. 2. The landing zone may be the same or similar to the landing zone 152 that is discussed above with respect to FIG. 1. The idle zone may be the same or similar to the idle zone 154 that is discussed above with respect to FIG. 1. Assigning the GDATs to the landing and idle zone may include updating a table that is used to define the idle and landing zones. The table may be the same or similar to the table 214, which is discussed above with respect to FIG. 4. Updating the table may include one or more of: (i) creating a plurality of table entries, (ii) inserting in each of the entries an identifier of a different one of the GDATs, and (iii) inserting in each of the entries an indication of whether the GDAT is assigned to the landing zone or the idle zone.

At step 708, an I/O request is received for the data volume (created at step 704).

At step 710, a cache slot is allocated for the I/O request. The cache slot may be part of a cache, such as the global memory 108, which is discussed above with respect to FIG. 1. Allocating the cache slot may include updating a table, such as table 212, which is discussed above with respect FIG. 3, to map a particular memory address in the cache to an LBA associated with the I/O request. In the present example, the age indicator is set to a "regular value" in the manner discussed above with respect to FIGS. 1-2. The regular value may be overwritten with an irregular value if a decision is made later to bias the cache slot.

At step 712, the type of the I/O request is determined. Specifically, a determination is made if the I/O request is a read request or a write request. A write request may include any request that involves the storage of data at the LBA associated with the I/O request. A write request may include a sequential write, a random write, a move, and/or any other suitable type of data storage request. A read request may include any suitable type of request that involves the retrieval of data from the associated LBA, such as a sequential read or a random read. If the I/O request is a write request, process 700 proceeds to step 714. If the I/O request is a read request, process 700 proceeds to step 724.

At step 714, data associated with the I/O request is stored in the cache slot (allocated at step 710).

At step 716, the data is destaged into the landing zone. Specifically, the LBA associated with the I/O request is mapped to a physical location in one of the GDATs in the landing zone (or their underlying RAID groups), and the data associated with the I/O request is stored at that physical table. The mapping between the LBA address and physical location may be performed by updating one or more metadata tables of storage system 101 (not shown), which are used for LBA-to-physical-address resolution.

At step 718, a determination is made whether to bias the cache slot (allocated at step 710). The determination may be performed by executing a process 900, which is discussed further below with respect to FIG. 9. If a determination is made to bias the cache slot, process 700 proceeds to step 720. Otherwise, process 700 proceeds to step 722.

At step 720, the cache slot is biased. The biasing may be performed by setting the age indicator of the cache slot to an "irregular age indicator value", in the manner discussed above with respect to FIGS. 1-2.

At step 722, the cache slot is deallocated after the cache slot has aged out. It will be understood that the present disclosure is not limited to any specific algorithm for assigning or deallocating cache slots.

At step 724, data associated with the I/O request is retrieved from any of the GDATs that host the volume (created at step 704).

At step 726, the data is returned to the sender of the request.

At step 728, a determination is made if the data was retrieved from a GDAT that was part of the landing zone or a GDAT that is part of the idle zone. If the data was retrieved from a GDAT that is currently assigned to the landing zone, process 700 proceeds to step 718. If the data is retrieved from a GDAT that is currently assigned to the idle zone, process 700 proceeds to step 720.

In the example of FIG. 7, cache slots used for servicing read requests from the idle zone are always biased, whereas cache slots used for servicing read requests from the landing zone are biased only sometimes. However, alternative implementations are possible in which cache slots used for servicing read requests from the landing zone are never biased. Furthermore, alternative implementations are possible in which cache slots used for servicing read requests from the landing zone are biased sometimes (or always) only when the rate of receipt of read requests for the data volume (created at step 704) is below a predetermined threshold. In such implementations, process 700 may branch from step 728 to step 718 only if the rate is below the threshold. If the rate is above the threshold, process 700 may proceed to step 722 when it is determined that the data is retrieved (at step 724) from the landing zone.

Figure 8:
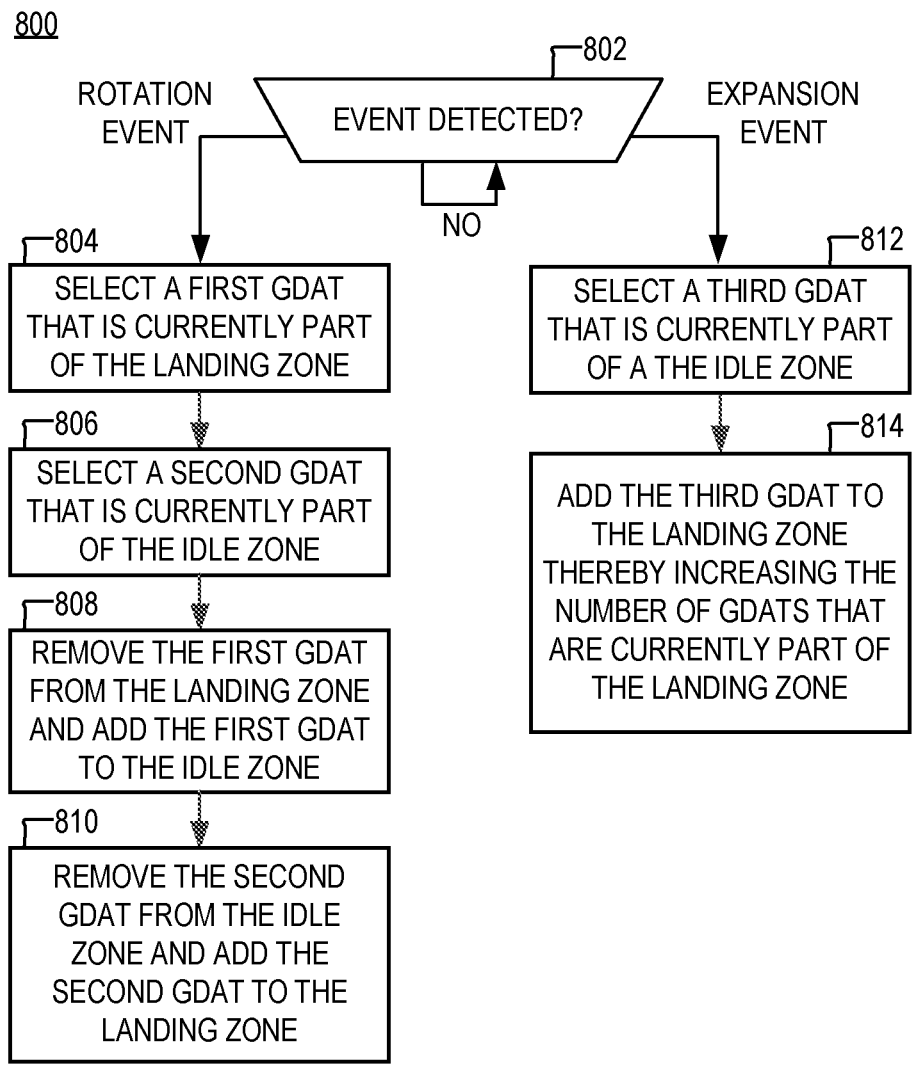
FIG. 8 is a flowchart of an example of a process, according to aspects of the disclosure.

FIG. 8 is a flowchart of an example of a process 800, according to aspects of the disclosure. According to the present example, process 800 is performed by manager 107. However, the present disclosure is not limited to any entity or set of entities performing process 800.

At step 802, a determination is made whether a rotation or expansion event is detected. If a rotation event is detected, process 800 proceeds to step 804. If an expansion event is detected, process 800 proceeds to step 812. If neither a rotation event nor an expansion event is detected, step 802 is performed again. As noted above, the rotation event triggers the rotation of GDATs in and out of a landing zone. For any GDAT that is removed from the landing zone, another GDAT currently in an idle zone is assigned to the landing zone. Thus, the size of the landing zone remains the same after the rotation is completed. The expansion event triggers the addition of a GDAT to the landing zone without removing any of the GDATs that are currently in the landing zone, thus increasing the overall size of the landing zone. The landing zone may be the same or similar to the landing zone discussed above with respect to FIG. 7. The idle zone may be the same or similar to the idle zone discussed above with respect to FIG. 7. The landing and idle zones may be defined by a table, such as table 214, which is discussed above with respect to FIG. 4.

At step 804, a first GDAT that is part of the landing zone is selected. In one example, the GDAT that is most worn-out of all GDATs in the landing zone may be selected. The selection may be performed by consulting the table used to define the landing and idle zones, identifying the respective wear metric of each of the GDATs that are currently assigned to the landing zone, and selecting the most worn-out GDAT among the GDATs that are currently assigned to the landing zone. In instances in which the wear metric is "endurance used", the GDAT having the greatest wear metric value may be selected. On the other hand, in instances in which the wear metric is "percent life used", the GDAT having the lowest wear metric value may be selected. The respective wear metrics of the GDATs may be identified by using a wear table, such as table 216, which is discussed above with respect to FIG. 5.

At step 806, a second GDAT that is currently assigned to the idle zone is selected. In one example, the GDAT that is the least worn-out of all GDATs in the landing zone may be selected. The selection may be performed by consulting the table used to define the landing and idle zones, identifying the respective wear metric of each of the GDATs that are currently assigned to the idle zone, and selecting the least worn-out GDAT among the GDATs that are currently assigned to the instances zone. In instances in which the wear metric is "endurance used", the GDAT having the smallest wear metric value may be selected. On the other hand, in instances in which the wear metric is "percent life used", the GDAT having the greatest wear metric value may be selected. The respective wear metrics of the GDATs may be identified by using a wear table, such as table 216, which is discussed above with respect to FIG. 5.

At step 808, the first GDAT is removed from the landing zone and added to the idle zone. Step 808 may be performed by modifying the table used to define the landing and idle zones to indicate that the first GDAT is now assigned to the idle zone.

At step 810, the second GDAT is removed from the idle zone and added to the landing zone. Step 810 may be performed by modifying the table used to define the landing and idle zones to indicate that the second GDAT is now assigned to the landing zone.

At step 812, a third GDAT is selected that is currently part of the idle zone. The selection may be performed in the manner discussed with respect to step 806.

At step 814, the third GDAT is added to the landing zone. Step 814 may be performed by modifying the table used to define the landing and idle zones to indicate that the third GDAT is now assigned to the landing zone. After the third GDAT is assigned to the landing zone, a landing zone size setting associated with the landing zone may be incremented by one.

FIG. 9 is a flowchart of an example of a process 900 for detecting whether a cache slot should be biased as specified by step 718 of process 700. At step 902, a bias term for a random variable is selected. At step 904, the distribution of the random variable is biased based on the bias term. At step 906, the random variable is sampled based on the random variable. At step 908, a determination is made if the random variable sample is true or false. If the value is true, a determination is made to bias the cache slot, and process 900 returns to step 720 of process 700. If the value is false, a determination is made not to bias the cache slot, and process 900 returns to step 722.

FIGS. 1-10 are provided as an example only. At least some of the steps discussed with respect to FIGS. 1-10 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the phrase the storage system is configured to route all write requests for the data volume that are received at the storage system to virtual storage devices that are part of a landing zone" shall mean that data associated with the write requests is stored only RAID groups that are represented by the virtual storage devices (e.g., GDATs) in the landing zone.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, the method comprising:
    instantiating a plurality of virtual storage devices, each virtual storage device corresponding to a different respective group of physical storage devices;
    assigning one or more of the plurality of virtual storage devices to a landing zone and assigning the rest of the plurality of virtual storage devices to an idle zone;
    instantiating a data volume, the data volume including a plurality of portions, each portion being hosted on a different respective one of the plurality of virtual storage devices;
    receiving an I/O request associated with the data volume, the I/O request being one of a read request or a write request;
    executing the I/O request, wherein executing the I/O request includes: (i) when the I/O request is a write request, storing data associated with the I/O request only in virtual storage devices that are part of the landing zone, and (ii) when the I/O request is a read request, retrieving data associated with the I/O request from any of the plurality of virtual storage devices,
    wherein the storage system is configured to route all write requests for the data volume that are received at the storage system to virtual storage devices that are part of the landing zone.

2. The method of claim 1, wherein:
    the I/O request is executed by using a cache slot in a global memory of the storage system, and when the I/O request is a read request for data stored in the idle zone, executing the I/O request includes biasing an age of the cache slot, so that a life of the cache slot is extended, and
    the storage system is configured to bias respective ages of all cache slots in the global memory of the storage system which store data that is retrieved from the idle zone.

3. The method of claim 1, wherein:
    the I/O request is executed by using a cache slot:
    when the I/O request is a read request for data stored in the idle zone, executing the I/O request includes unconditionally biasing an age of the cache slot, so that a life of the cache slot is extended; and
    when the I/O request is a write request or a read request for data stored in the landing zone, executing the I/O request includes conditionally biasing the age of the cache slot.

4. The method of claim 3, wherein conditionally biasing the age of the cache slot includes:
    selecting a bias term for a random variable based on a utilization metric that is associated with the idle zone and sampling the random variable to obtain a sample of the random variable;
    when the sample satisfies a predetermined condition, biasing the age of the cache slot; and
    when the sample fails to satisfy the predetermined condition, abstaining from biasing the age of the cache slot.

5. The method of claim 1, further comprising:
    identifying a wear metric that is associated with a first one of the plurality of virtual storage devices that is currently part of the landing zone; and
    in response to detecting that the wear metric satisfies a predetermined condition, selecting a second one of the plurality of virtual storage devices that is currently part of the idle zone, assigning the first virtual storage device to the idle zone, and assigning the second virtual storage device to the landing zone.

6. The method of claim 5, wherein the second virtual storage device is selected based on a wear metric of the second virtual storage device.

7. The method of claim 1, further comprising:
    identifying a utilization metric that is associated with the landing zone;
    in response to the utilization metric satisfying a predetermined condition: selecting one of the plurality of virtual storage devices that is currently part of the idle zone, and assigning the selected virtual storage device to the landing zone, thereby increasing a size of the landing zone.

8. A storage system, comprising:
a memory; and
one or more processors that are operatively coupled to the memory, the one or more processors being configured to perform the operations of:
instantiating a plurality of virtual storage devices, each virtual storage device corresponding to a different respective group of physical storage devices;
assigning one or more of the plurality of virtual storage devices to a landing zone and assigning the rest of the plurality of virtual storage devices to an idle zone;
instantiating a data volume, the data volume including a plurality of portions, each portion being hosted on a different respective one of the plurality of virtual storage devices;
receiving an I/O request associated with the data volume, the I/O request being one of a read request or a write request;
executing the I/O request, wherein executing the I/O request includes: (i) when the I/O request is a write request, storing data associated with the I/O request only in virtual storage devices that are part of the landing zone, and (ii) when the I/O request is a read request, retrieving data associated with the I/O request from any of the plurality of virtual storage devices,
wherein the storage system is configured to route all write requests for the data volume that are received at the storage system to virtual storage devices that are part of the landing zone.

9. The storage system of claim 8, wherein:
the I/O request is executed by using a cache slot in a global memory of the storage system, and when the I/O request is a read request for data stored in the idle zone, executing the I/O request includes biasing an age of the cache slot, so that a life of the cache slot is extended, and
the storage system is configured to bias respective ages of all cache slots in the global memory of the storage system which store data that is retrieved from the idle zone.

10. The storage system of claim 8, wherein:
the I/O request is executed by using a cache slot:
when the I/O request is a read request for data stored in the idle zone, executing the I/O request includes unconditionally biasing an age of the cache slot, so that a life of the cache slot is extended; and
when the I/O request is a write request or a read request for data stored in the landing zone, executing the I/O request includes conditionally biasing the age of the cache slot.

11. The storage system of claim 10, wherein conditionally biasing the age of the cache slot includes:
selecting a bias term for a random variable based on a utilization metric that is associated with the idle zone and sampling the random variable to obtain a sample of the random variable;
when the sample satisfies a predetermined condition, biasing the age of the cache slot; and
when the sample fails to satisfy the predetermined condition, abstaining from biasing the age of the cache slot.

12. The storage system of claim 8, wherein the one or more processors are further configured to perform the operations of:
identifying a wear metric that is associated with a first one of the plurality of virtual storage devices that is currently part of the landing zone; and
in response to detecting that the wear metric satisfies a predetermined condition, selecting a second one of the plurality of virtual storage devices that is currently part of the idle zone, assigning the first virtual storage device to the idle zone, and assigning the second virtual storage device to the landing zone.

13. The storage system of claim 12, wherein the second virtual storage device is selected based on a wear metric of the second virtual storage device.

14. The storage system of claim 8, wherein the one or more processors are further configured to perform the operations of:
identifying a utilization metric that is associated with the landing zone;
in response to the utilization metric satisfying a predetermined condition: selecting one of the plurality of virtual storage devices that is currently part of the idle zone, and assigning the selected virtual storage device to the landing zone, thereby increasing a size of the landing zone.

15. A non-transitory computer-readable medium storing one or more processor-executable instructions, which, when executed by one or more processors in a storage system, cause the one or more processors to perform the operations of:
instantiating a plurality of virtual storage devices, each virtual storage device corresponding to a different respective group of physical storage devices;
assigning one or more of the plurality of virtual storage devices to a landing zone and assigning the rest of the plurality of virtual storage devices to an idle zone;
instantiating a data volume, the data volume including a plurality of portions, each portion being hosted on a different respective one of the plurality of virtual storage devices;
receiving an I/O request associated with the data volume, the I/O request being one of a read request or a write request;
executing the I/O request, wherein executing the I/O request includes: (i) when the I/O request is a write request, storing data associated with the I/O request only in virtual storage devices that are part of the landing zone, and (ii) when the I/O request is a read request, retrieving data associated with the I/O request from any of the plurality of virtual storage devices,
wherein the storage system is configured to route all write requests for the data volume that are received at the storage system to virtual storage devices that are part of the landing zone.

16. The non-transitory computer-readable medium of claim 15, wherein:
the I/O request is executed by using a cache slot in a global memory of the storage system, and when the I/O request is a read request for data stored in the idle zone, executing the I/O request includes biasing an age of the cache slot, so that a life of the cache slot is extended, and
the storage system is configured to bias respective ages of all cache slots in the global memory of the storage system which store data that is retrieved from the idle zone.

17. The non-transitory computer-readable medium of claim 15, wherein:
the I/O request is executed by using a cache slot:

when the I/O request is a read request for data stored in the idle zone, executing the I/O request includes unconditionally biasing an age of the cache slot, so that a life of the cache slot is extended; and when the I/O request is a write request or a read request for data stored in the landing zone, executing the I/O request includes conditionally biasing the age of the cache slot.

18. The non-transitory computer-readable medium of claim 17, wherein conditionally biasing the age of the cache slot includes:

selecting a bias term for a random variable based on a utilization metric that is associated with the idle zone and sampling the random variable to obtain a sample of the random variable;

when the sample satisfies a predetermined condition, biasing the age of the cache slot; and when the sample fails to satisfy the predetermined condition, abstaining from biasing the age of the cache slot.

19. The non-transitory computer-readable medium of claim 17, wherein the one or more processor-executable instructions, when executed by the one or more processors, further cause the one or more processors to perform the operations of:

identifying a wear metric that is associated with a first one of the plurality of virtual storage devices that is currently part of the landing zone; and in response to detecting that the wear metric satisfies a predetermined condition, selecting a second one of the plurality of virtual storage devices that is currently part of the idle zone, assigning the first virtual storage device to the idle zone, and assigning the second virtual storage device to the landing zone.

20. The non-transitory computer-readable medium of claim 19, wherein the second virtual storage device is selected based on a wear metric of the second virtual storage device.

\* \* \* \* \*